United States Patent [19]

Oosaka et al.

[11] Patent Number: 4,713,706
[45] Date of Patent: Dec. 15, 1987

[54] DEVICE FOR MOUNTING MAGNETIC HEAD

[75] Inventors: Sigenori Oosaka; Kenji Negishi, both of Ashigarakami, Japan

[73] Assignee: Fuji Photo Film Co., Ltd., Minami-ashigara, Japan

[21] Appl. No.: 782,898

[22] Filed: Oct. 2, 1985

[30] Foreign Application Priority Data

Oct. 5, 1984 [JP] Japan .................. 59-151114[U]

[51] Int. Cl.$^4$ .............. G11B 5/50; G11B 5/56; G11B 21/24; G11B 21/26
[52] U.S. Cl. ........................ 360/104; 360/109
[58] Field of Search ............. 360/86, 97–99, 360/104, 105, 106, 109, 110, 129; 369/219, 221, 223

[56] References Cited

U.S. PATENT DOCUMENTS 4,003,092  1/1977  Hirata ................................. 360/109
4,562,501 12/1985  Cantwell ............................ 360/109

FOREIGN PATENT DOCUMENTS 55-77029   6/1980  Japan ................................ 360/109
59-160869  9/1984  Japan ................................ 360/109
60-7609    1/1985  Japan ................................ 360/104
60-131611  7/1985  Japan ................................ 360/104
60-163223  8/1985  Japan ................................ 360/109

Primary Examiner—Stuart N. Hecker
Assistant Examiner—Benjamin E. Urcia
Attorney, Agent, or Firm—Parkhurst & Oliff

[57] ABSTRACT

In this device for mounting a magnetic head, a block mounted thereto with the magnetic head is secured to a mount through magnets, so that the operations of mounting and removing the magnetic head can be easily carried out at a stroke. Furthermore, the magnets of the block and the magnets of the mount are shifted in position in a direction of setting the block aside, so that loosenesses between positioning holes formed in the block and positioning pins provided on the mount can be absorbed.

4 Claims, 16 Drawing Figures

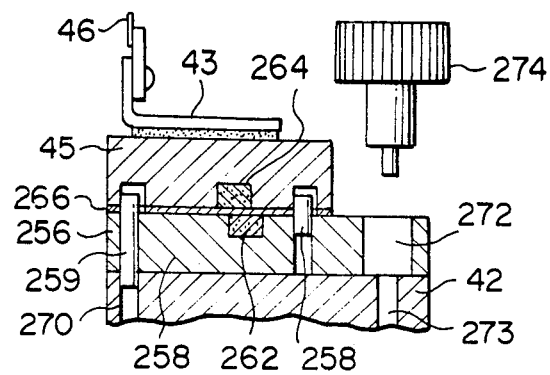
F I G.11
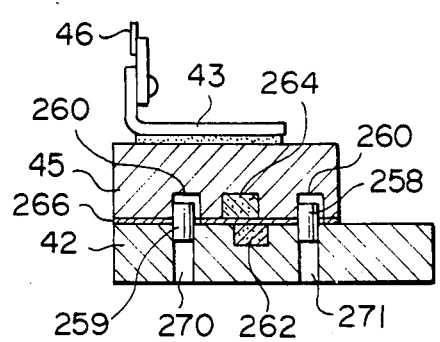
F I G.12
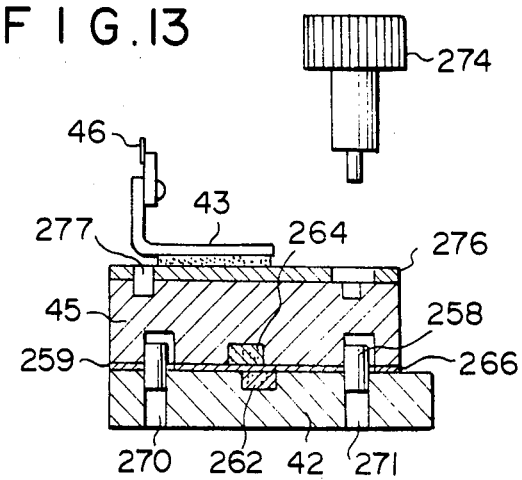
F I G.13

DEVICE FOR MOUNTING MAGNETIC HEAD

BACKGROUND OF THE INVENTION

1. Field of the Invention

This invention relates to a device for mounting a magnetic head, and particularly to a device for mounting a magnetic head as used in a magnetic recorder or reproducer in an electronic camera or the like.

2. Recently, there has been developed an electronic still camera system wherein an image pickup device such as a charge coupled device (CCD) or an image pickup tube is combined with a recording device using a magnetic disc. This is inexpensive as a recording medium and yet has a comparatively high memory capacity. A subject is still-photographed electronically and recorded onto a rotating magnetic disc, and the reproduction of an image is carried out by a television, a printer or the like.

Now, the magnetic disc of this type used in the electronic camera or the like, differing from the magnetic disc used in the ordinary magnetic recorder or reproducer, has recorded therein still image or moving image information and the like in a high density, and rotates at a high speed. In consequence, it is necessary for the magnetic head for performing recording or reproducing in contact with the magnetic disc to be accurately adjusted in positional relationship with the magnetic disc. Such being the case, for the magnetic head used in recording or reproducing of still image information and the like in an electronic camera or the like, adjustments of the following five types with respect to the magnetic disc are required, which include (1) a projection value, (2) an inclination angle, (3) a shift in the center-alignment, (4) a shift in azimuth, and (5) a tilt. Out of these adjustments, (2) the inclination angle and (5) tilt may be corrected, but not with adjustment, and only if they are very small. Description will successively given of these adjustments of the five types with reference to FIG. 1 to 3.

In FIG. 1, designated at 10 is a magnetic disc, 12 a magnetic head for performing recording into or reproducing from this magnetic disc 10, and 14 a regulating plate provided at a position opposed to the magnetic head 12 through the magnetic disc 10, for placing the magnetic disc 10 along the magnetic head 12. It is necessary for the magnetic head 12 to have a projection value Ea within a predetermined range with respect to the magnetic disc 10. In order to perform better recording and reproducing and prevent the magnetic head and a recording medium from being worn, it is necessary to perform fine adjustments.

Furthermore, in order to obtain a satisfactory reproduced image even when one and the same recording medium is loaded into reproducers different from each other, and further, when the recorder and the reproducer are separately constructed, namely, a recording head and a reprocuding head, which are separately formed, are used, it is necessary that the inclination angle θa, a shift value Eb of the magnetic head relative to the center of the magnetic disc 10 and the azimuth shift θb as shown in FIG. 2, and further, the tilt angle θc of the magnetic head relative to the magnetic disc 10 as shown in FIG. 3 remain within predetermined ranges having interchangeabilities, respectively.

Now, normally, the magnetic head is solidly secured to a head block after the projection value, inclination, shift in center alignment and swing are adjusted, and this head block is secured to a head carriage. However, it is necessary to remove the head block from the head carriage due to wear, etc. of the magnetic head. In this case, if the head block is secured to the head carriage by screwing, etc., then, it is troublesome to do the works of removing and mounting the head block and it takes several labor hours in positioning adjustment of the head block after the head block is mounted onto the head carriage.

SUMMARY OF THE INVENTION

The present invention has been developed to obviate the disadvantages of the prior art and has as its object the provision of a device for mounting a magnetic head wherein works of mounting and removing a head block can be easily performed and the head block can be easily positioned after being mounted.

To this end, the present invention contemplates that, in a device for mounting a magnetic head secured to a head carriage, for moving in the radial direction of a rotating magnetic disc to make the recording onto or the reproducing from the magnetic disc, the device comprises:

a block solidly secured to the magnetic head;

positioning means including at least two positioning projections formed on one of the block and the head carriage and positioning holes for receiving the positioning projections formed on the other of the block and the head carriage; and magnet attracting means secured to jointing surfaces of the block and the head carriage and respectively shifted in position in a direction of setting the block aside.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 11 is a sectional view showing the device for mounting a magnetic head;

FIGS. 12 and 13 are schematic sectional views showing a second embodiment of the present invention;

DETAILED DESCRIPTION OF THE INVENTION

Detailed description will hereunder be given of the preferred embodiment of a device for mounting a magnetic head according to the present invention with reference to the accompanying drawings.

Figure 1:
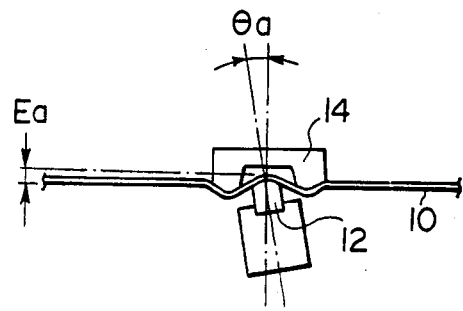
FIG. 1 is an explanatory view showing a projection value and an inclination angle of the magnetic head.
Figure 2:
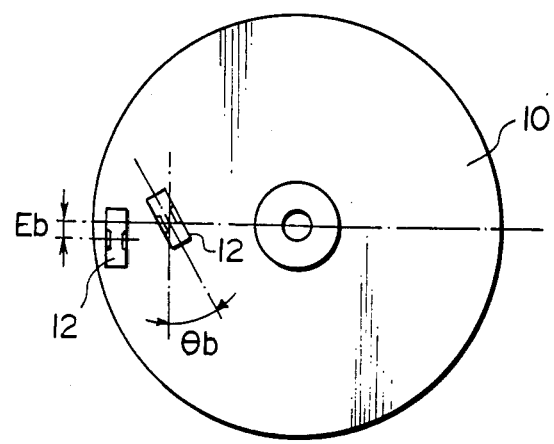
FIG. 2 is an explanatory view showing a shift in center-alignment and a shift in azimuth of the magnetic head.
Figure 3:
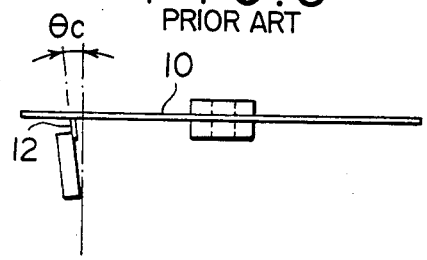
FIG. 3 is an explanatory view showing a tilt.
Figure 4:
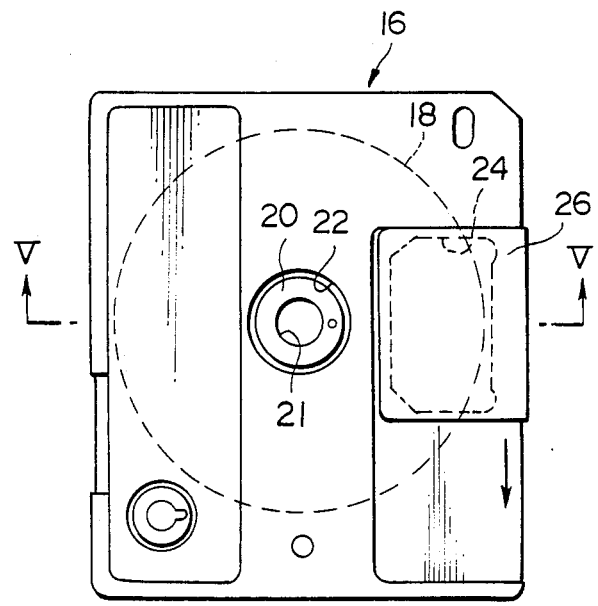
FIG. 4 is a plane view showing the magnetic disc pack.
Figure 5:
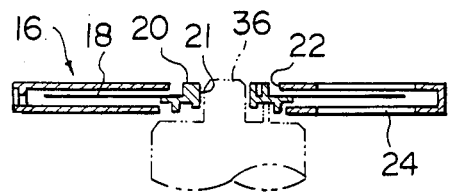
FIG. 5 is a sectional view taken along the line V—V in FIG. 4 showing the magnetic disc pack.

FIG. 4 is a plane view showing a magnetic disc pack used in a magnetic recorder or a reproducer in an electronic camera or the like, and FIG. 5 is a sectional view taken along the line V—V in FIG. 4. As shown in FIG. 4, the magnetic disc pack 16 is formed into a generally square shape and has rotatably mounted therein a magnetic disc 18 capable of recording therein still image information and the like. The magnetic disc 18 is provided in the central portion thereof with a center core 20 as being a reinforcing member, which is exposed to outside through a circular opening 22 of the magnetic disc pack 16. The magnetic disc pack 16 is formed with a window 24, at which is located a magnetic head to be described hereunder, and this window 24 for the magnetic head is opened or closed by a slidable shutter 26. More specifically, before the magnetic disc pack 16 is inserted into an inner bucket to be described hereunder, the shutter 26 closes the window 24 to prevent dust from being attached to the magnetic disc 18, and, when the magnetic disc pack 16 is inserted into the inner bucket, the shutter 26 moves downward in FIG. 4 to open the window 24 for the magnetic head, whereby the recording onto the magnetic disc 18 and the reproduction therefrom can be performed.

Figure 6:
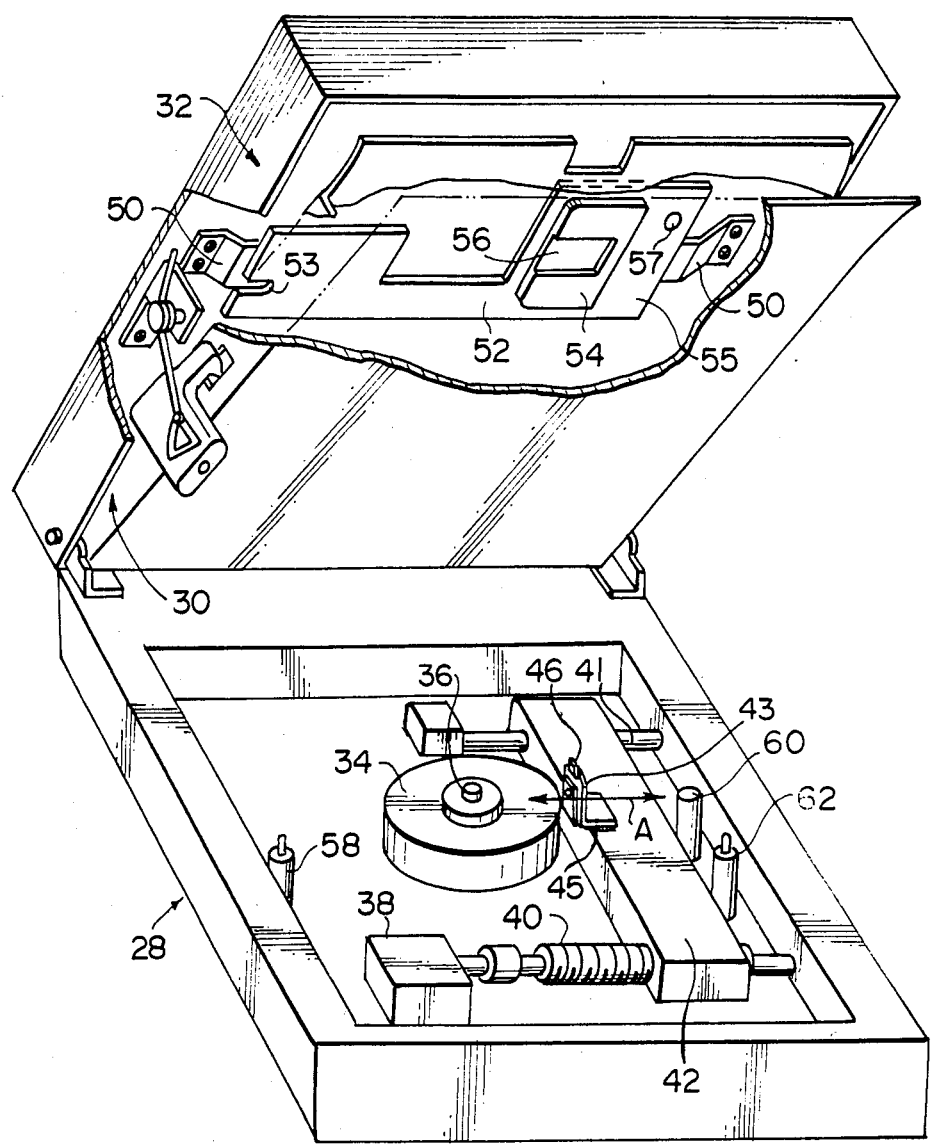
FIG. 6 is a perspective view showing the magnetic disc pack.

FIG. 6 shows the magnetic recorder or reproducer in an electronic camera or the like, to which is applied the device for loading or unloading the magnetic disc pack according to the present invention. The magnetic recorder or reproducer includes a main body 28, an inner bucket 30 and a lid 32. Firstly, description will be given to the inner construction of the main body 28 of the magnetic recorder or reproducer. The main body 28 is provided therein with a motor 34 for driving a magnetic disc 18. A drive shaft 36 of this motor 34 is coupled into a center hole 21 of a center core 20 of the magnetic disc pack 16 as shown in FIG. 5 and rotates the magnetic disc 18 at a predetermined rotation number in the magnetic disc pack 16. In Fig.6, designated at 38 is a motor for driving the magnetic head, 40 a lead screw connected to an output shaft of this motor 38, 41 a guide shaft, 42 a head carriage threadably coupled to this lead screw 40 and guided by a guide shaft 41 to move, and 46 a magnetic head provided through a head plate 43 and a head block 45 on the head carriage 42. In consequence, when the motor 38 is rotated at a predetermined rotation number, the head carriage 42 is moved by a pre-determined pitch in the axial direction of the guide shaft 41 by the rotation of the lead screw 40, whereby the magnetic head 46 moves in the radial direction of the magnetic disc 18, so that circular tracks or spiral tracks are formed on the magnetic disc 18 and the still image information can be recorded or reproduced per track on the magnetic disc 18.

The lid 32 is provided on the rear surface thereof with leaf springs 50 and 50, each of which is bent into a crank shape, at a predetermined interval, and a regulating plate holder 52 is secured to these leaf springs 50 and 50. The regulating plate holder 52 has a length corresponding to substantially the total width of the main body 28, and further, as shown in FIG. 6, the regulating plate holder 52 is provided with a regulating plate 54 at a position opposed to the magnetic head 46 when the lid 32 is closed. The regulating plate 54 is formed with a groove 56 in the moving direction of the magnetic head 46. On the other hand, a receiving pin 58 is planted on the main body 28 to the left in FIG. 6, and receiving pins 60 and 62 are also planted on the main body 28 to the right. The receiving pins 58, 60 and 62 are brought into abutting contact with or coupled into a slot 53, a holder surface 55 and a cylindrical hole 57, whereby the regulating plate 54 is regulated in its height so that the regulating plate 54 can hold a predetermined interval with respect to the magnetic head 46 and be positioned accurately.

Figure 7:
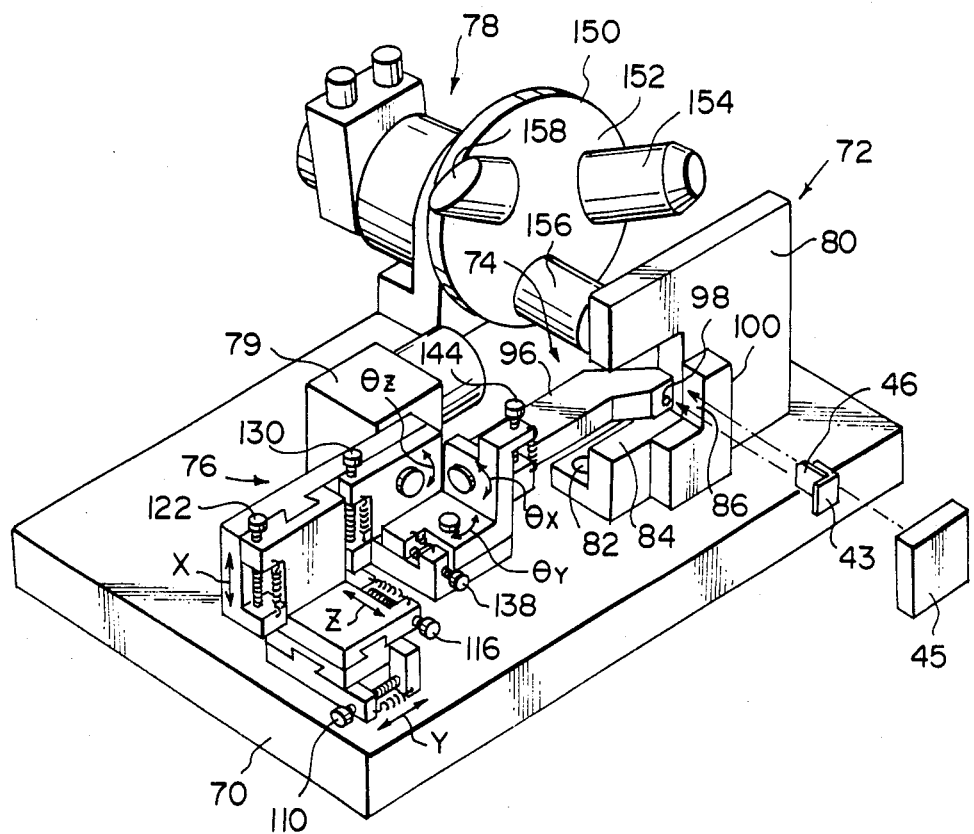
FIG. 7 is a general perspective view of the adjusting jig.

FIG. 7 shows the outline of the construction of the adjusting jig device for the magnetic head according to the present invention. As shown in FIG. 7, the adjusting jig device for the magnetic head comprises: a base 70; a mounting jig 72 erected on the base 70, for supporting the head block 45; magnetic head holding means 74 for attracting and provisionally holding a head plate 43 secured thereto with the magnetic head 46; six-direction moving means 76 for moving the magnetic head holding means 74 in six directions with respect to the mounting jig 72; optical measuring means 78 for measuring a position of the magnetic head 46 held by the magnetic head holding means 74 relative to the head block 45; and an ultra-violet ray irradiation device 79 for curing a bonding agent for securing the magnetic head. The mounting jig 72 is formed of a generally L-shaped mounting plate 80, the bottom end portion of which is fixed to the top surface of the base 70 through screws 82. This mounting plate 72 is formed with a rectangular window having an opening 84, and the magnetic head holding means 74 capable of moving in the six directions is positioned in this opening 84. Furthermore, the mounting plate 80 is formed with a L-shaped reference surface 86, onto which the head block 45 is rested.

The following is the adjusting process by use of the magnetic head adjusting jig device with the above-described arrangement.

(1) Firstly, the head plate 43, to which the magnetic head 46 is mounted, is sucked and provisionally held by the suction surface 98 at the forward end portion of the arm 96.

(2) Subsequently, the DI lens 156 of the objective lens section 150 of the microscope is set at a position for the observation by the rotation of the revolver 152. While the interference microscope is utilized in this condition, the first, second and third adjusting screws 110, 116 and 122 are rotated to move the magnetic head 46 in the direction X, Y and Z, and the head gap is roughly registered with a cross within the visual field in the microscope, whereby the magnetic head 46 is approximately positioned in the directions of X, Y and Z.

Figure 8:
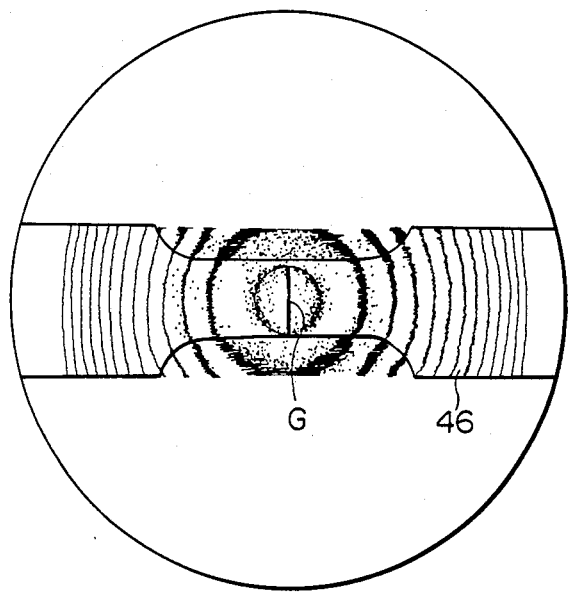
FIG. 8 is an explanatory view showing the interior of the viewfield of the interference microscope.

(3) FIG. 8 shows a portion in the visual field of the interference microscope. When the gap G of the magnetic head 46 is shifted upwardly from the center of the Moire fringes, adjustment in tilt is required, and, when the gap G is shifted in the lateral direction, adjustment in inclination is needed. More specifically, the fifth and sixth adjusting screws 138 and 144 are rotated to rotate the magnetic head 46 in the directions θX (inclination) and θY (tilt), whereby the center of Moire fringes is registered with the head gap G, so that the magnetic head 46 is adjusted in inclination and tilt.

Figure 9:
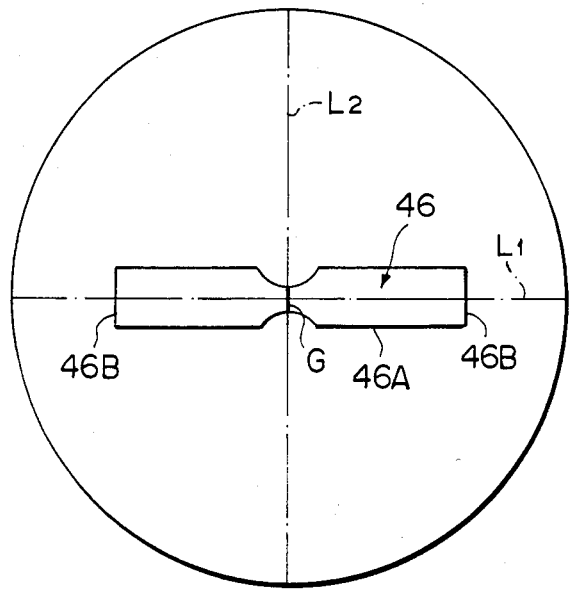
FIG. 9 is an explanatory view of the interior of the viewfield of an ordinary microscope.

(4) Next, the revolver 152 is rotated again to set the originary microscopic lens 154 at a position for the observation. An inclination from a lateral line L1 of the cross within the visual field of the microscope as shown in FIG. 9 indicates a shift in azimuth, and a shift of the head gap G from a vertical line L2 of the cross indicates a shift in center-alignment. While the microscope is being observed, the screw 110 is rotated to move the magnetic head in the direction Y. Further, the fourth adjusting screw 130 is rotated to move the magnetic head 46 in the direction θZ. With the above-described operations, an end face 46A of the head is made to be registered with the lateral line L1 of the cross (or the first adjusting screw 122 is rotated to move the magnetic head 46 in the direction X, whereby a value of shift between the head 46 and the vertical line L2 of the cross by use of the opposite end faces 46B and 46B, so that the fourth adjusting screw 130 is rotated to move the head 46 in the direction θZ for the adjustment). With the above-described operations, adjustments in azimuth and in a shift in center-alignment are performed.

(5) Subsequently, the magnetic head 46 is moved in the directions X and Y to register the center of the head gap G with the cross within the visual field of the microscope, and the adjusting screw 116 is operated to move the magnetic head 46 in the direction Z, whereby the magnetic head 46 is registered with the focusing position. The focusing position of the microscope is preset at the position of the projection value of the head 46. Since the focusing depth of the microscope is very small, adjustment in the projection value can be accurately made by the registration with the focusing position.

(6) With the above-described operations, adjustment of the magnetic head 46 is completed. Then an ultra-violet ray curing type bonding agent is applied to the bottom face of the head block 45.

(7) In this state, the head block 45 is set along the reference surface 86 so as to be regulated in the direction, rested on the mounting plate 80 and fixed to clampers and the like as necessary.

(8) Next, the revolver 152 is rotated to set the mirror 158 at a predetermined position.

(9) In this state, the ultra-violet ray beam is emitted from the ultra-violet ray irradiation device 79 to cure the bonding agent.

(10) Subsequently, air suction is stopped to release the main body 28 from the suction surface 98.

The mounting of the magnetic head to the head block 45 and adjastments of the projection value, inclination, shift in center alignment and swing of the magnetic head are completed by the above-described operations.

Figure 10:
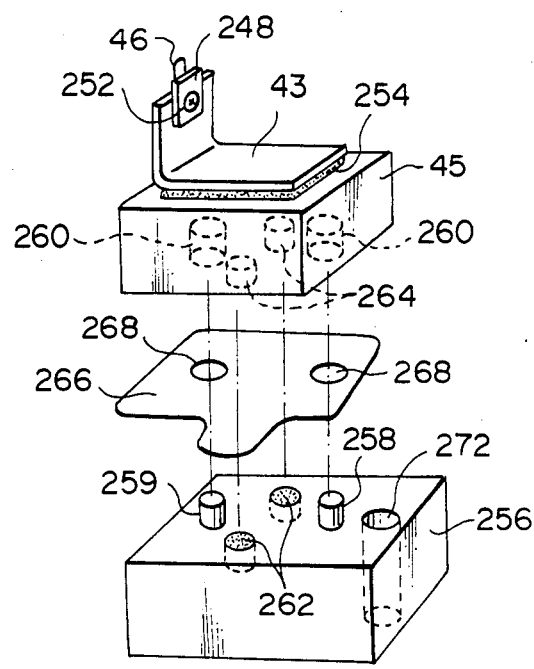
FIG. 10 is a disassembled perspective view showing the device for mounting a magnetic head according to the present invention.

FIGS. 10 and 11 show the device for mounting a magnetic head according to the present invention, FIG. 10 being the disassembled perspective view thereof and FIG. 11 being the sectional view showing the mounted state thereof. The magnetic head 46 is solidly secured to a head base 248, which in turn is secured to the mounting plate 43. More specifically, the head mounting plate 43 is bent into an L-shape in cross section and a rising piece thereof is threadably coupled thereto with the head base 248 mounted thereto with the magnetic head 46, through a screw 252. After the above-described adjustments of the projection value, inclination, shift in center alignment and swing of the head mounting plate 43 thus constructed are completed, the bottom face of the head mounting plate 43 is solidly secured to the head block 45 through an adhesive 254.

The head block 45 is mounted to a head block mount 256. More specifically, the head block mount 256 is planted thereon with positioning pins 258 and 259, and further, the head block 45 is formed on the rear surface thereof with positioning holes 260 and 260 for receiving these positioning pins 258 and 259. Further, a pair of magnets 262 and 262 are embedded in the head block mount 256 in a direction perpendicularly intersecting a rectilinear direction connecting the positioning pins 258 and 259 to each other. Similarly, a pair of magnets 264 and 264 are secured to the rear surface of the head block 45 in opposed relationship to the magnets 262 and 262. As shown in FIG. 11, the magnets 262 and 264 are slightly shifted in position from each other, whereby, in the state where the head block 45 is mounted to the mount 256, the head block 45 is set aside by the attracting forces of the magnets 262 and 264, so that loosenesses between the positioning pins 258, 259 and the positioning holes 260, 260 can be absorbed. Further, a shim or shims 266 for adjusting the height is interposed between the head block 45 and the mount 256. Each of the shims 266 for adjusting the height is formed of a thin stainless steel sheet having a thickness of about 10 microns. A necessary number of shims are inserted between the head block 45 and the mount 256, so that the projection value of the magnetic head 46 can be adjusted. The shim 266 is previously formed therethrough with holes 268 and 268, so that the positioning pins 258 and 259 can be inserted there through.

As shown in FIG. 11, the mount 256 is secured to the head carriage 42. More specifically, the positioning pin 259 penetrating through the mount 256 and projecting to the side of the head carriage 42 is coupled into a hole 270 formed in the head carriage 42. The mount 256 is rotatably supported by this pin 259. A hole 272 is formed in the mount 256 in opposite relationship to the pin 259, and further, a small-diameter hole 273 is formed in the head carriage 42 in opposed relationship to this hole 272. An eccentric pin 274 is inserted into the hole 272, whereby the head block mount 256 is rotated, so that the azimuth adjustment can be performed.

In the embodiment of the device for mounting a magnetic head according to the present invention with the above described arrangement, the head block 45 is secured to the head block mount 256 through the magnets 262, 262, 264 and 264, the mounting and removing operations thereof can be easily made at a stroke, differing from the case of screwing and the like. Moreover, the magnets 262 and 264 are shifted in position in the direction of setting the head block aside, whereby the looseness between the positioning pins 258, 259 and the positioning holes 260, 260 can be absorbed, so that the head block 45 can be accurately secured to the mount 256.

Furthermore, in the above embodiment, a suitable number of the shims 266 for adjusting the height can be inserted between the head block 45 and the mount 256, so that, even if the magnetic head 46 is worn due to the use thereof, the projection value can be easily adjusted by suitably increasing or decreasing the number of the shims 266.

Additionally, in the above embodiment, the magnets are provided on both the head block 45 and the head block mount 256, however, the magnets on one side may be replaced by magnetic materials. Furthermore, a plurality of sets of magnets may be provided, not only one set of magnets.

In the above embodiment, two positioning pins have been provided, however, more than two positioning pins may be provided. Furthermore, the positioning pins need not necessarily be provided, and the positioning means may be constituted by positioning balls and tapered holes for receiving these balls.

FIG. 12 is a schematic sectional view showing the second embodiment of the present invention. The portions common to FIGS. 10 and 11 are given with the same reference numerals. In FIG. 12, holes 271 and 270 for receiving the positioning pins 258 and 259 are provided in the head carriage 42, and the magnets 262 are embedded in a manner to take the set-aside positions relative to the magnets 264 provided on the head block 45.

Furthermore, in FIG. 13, an azimuth adjusting plate 276 is provided between the head mounting plate 43 and the head block 45 in the second embodiment, whereby the azimuth adjusting plate 276 is rotated about a pin 277 by the eccentric pin 274, so that an azimuth angle can be adjusted.

Figure 14:
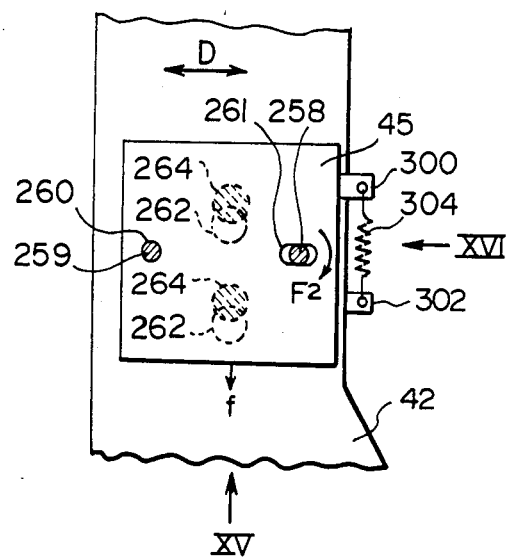
FIG. 14 is a general plan view showing a third embodiment of the device for mounting a magnetic device.
Figure 15:
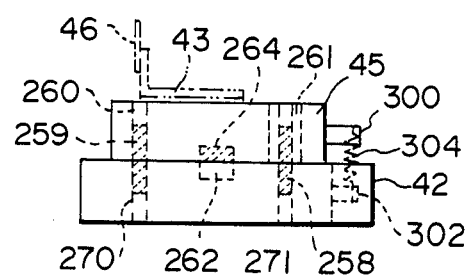
FIG. 15 is a general view showing the device looking from a direction indicated by an arrow XV in FIG. 14.
Figure 16:
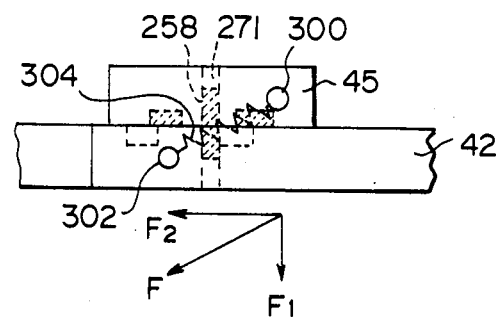
FIG. 16 is a general view showing the device looking from a direction indicated by an arrow XVI in FIG. 14.

Description will hereunder be given of the third embodiment of the present invention with reference to Figs. 14 to 16. Here, in FIGS. 14 to 16, portions common to those in FIGS. 12 and 13 are given the same reference numerals.

FIG. 14 is the general plan view showing the device for mounting a magnetic head in this third embodiment, Fig. 15 is the general view showing the device in looking from a direction indicated by the arrow XV in FIG. 14 and FIG. 16 is a general view showing the device in looking from a direction indicated by the arrow XVI in FIG. 14. The magnetic head 46 and the magnetic head mounting plate 43 are joined and fixed to positions indicated by hypothetical lines in FIG. 15 by use of the above-mentioned mounting jig, etc. The head block 45 is formed therein with a round hole 260 for receiving the positioning pin 259 and with a slot 261 for receiving the positioning pin 258.

In this embodiment, the magnets 264 and the magnets 262 are in the set-aside positions in a direction perpendicularly intersecting the direction shown in the above-described embodiment, i.e. a direction perpendicularly intersecting the moving direction of the magnetic head indicated by a doubleheaded arrow D in FIG. 14. In consequence, the head block 45 receives a force in a direction indicated by an arrow f in FIG. 14, relative to the head carriage 42.

On the other hand, the head block 45 and the head carriage 42 are provided thereon with spring-mounting pins 300 and 302, to which a spring 304 is secured, respectively. The head block 45 and the head carriage 42 receive a force in a direction of closely attaching (a component of force F 1 of a force F of the spring 304 as shown in FIG. 16), and the head block 45 receives a rotary force (a component of force F 2) in a clockwise direction as centered about the positioning pin 259 in FIG. 14 and to the left in FIG. 16.

In the third embodiment as described above, one of the positioning holes is formed into the slot 261 and the head block 45 is biased in a manner to be rotatable about the positioning pin 259 in a direction perpendicularly intersecting the slot 261, so that highly accurate positionings including one in the azimuth direction can be achieved.

Furthermore, the head block 45 is constantly biased in the closely attaching direction (F1) relative to the head carriage 42 and in the above-described rotary direction (F2), so that the reproducibility of mounting is satisfactory and no shift in position due to disturbances such as vibrations is caused.

What is claimed is:

1. A device for mounting a magnetic head to a head carriage, said carriage being arranged to move said head in the radial direction of a rotating magnetic disc for recording onto or reproducing from said magnetic disc, said device comprising:
   a block solidly secured to said magnetic head;
   positioning means for aligning said block with said head carriage, said positioning means including at least two positioning projections formed on one of said block and said head carriage and positioning holes for receiving said positioning projections formed on the other of said block and said head carriage; and
   magnet attracting means for securing said block to said head carriage, said magnet attracting means including magnets for biasing said positioning projections against walls of said positioning holes in a direction parallel to the plane of said magnetic disc, said magnets being secured to facing planar surfaces of said block and said head carriage, the magnets secured to the block being offset from the magnets secured to the head carriage in the direction parallel to the plane of the magnetic disc so that an attractive force between complementary magnets includes components parallel and perpendicular to said direction.

2. A device for mounting a magnetic head as set forth in claim 1, wherein a spacer or spacers are provided between the facing planar surfaces of said block and said head carriage.

3. A device for mounting a magnetic head as set forth in claim 2, wherein an azimuth adjusting plate is provided between said magnetic head and said block.

4. A device for mounting a magnetic head as set forth in claim 3, wherein said block and said head carriage are connected to each other by a spring, said block being biased toward said head carriage and further rotatably biased about one of said positioning pins.

* * * * *